United States Patent
Yeh et al.

(10) Patent No.: US 9,519,187 B2
(45) Date of Patent: Dec. 13, 2016

(54) PIXEL STRUCTURE

(71) Applicant: AU Optronics Corporation, Hsin-Chu (TW)

(72) Inventors: Chao-Wei Yeh, Hsin-Chu (TW); Tien-Lun Ting, Hsin-Chu (TW); Wen-Hao Hsu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 206 days.

(21) Appl. No.: 14/287,711

(22) Filed: May 27, 2014

(65) Prior Publication Data
US 2015/0049288 A1 Feb. 19, 2015

(30) Foreign Application Priority Data
Aug. 19, 2013 (TW) .............................. 102129682 A

(51) Int. Cl.
G02F 1/1343 (2006.01)
G02F 1/1337 (2006.01)
G02F 1/139 (2006.01)

(52) U.S. Cl.
CPC ....... *G02F 1/133707* (2013.01); *G02F 1/1393* (2013.01); *G02F 1/134336* (2013.01)

(58) Field of Classification Search
None
See application file for complete search history.

(56) References Cited

U.S. PATENT DOCUMENTS

| | | | |
|---|---|---|---|
| 6,441,877 B1 * | 8/2002 | Watanabe | G02F 1/133707 349/138 |
| 6,654,090 B1 | 11/2003 | Kim et al. | |
| 2007/0046878 A1 * | 3/2007 | Huang | G02F 1/133371 349/129 |
| 2011/0157537 A1 * | 6/2011 | Chen | G02F 1/133707 349/158 |
| 2011/0260957 A1 * | 10/2011 | Jeong | G02F 1/133707 345/98 |
| 2011/0317104 A1 * | 12/2011 | Nakamura | G02F 1/133371 349/106 |
| 2013/0321753 A1 * | 12/2013 | Lu | G02F 1/133707 349/139 |
| 2015/0002798 A1 * | 1/2015 | Miyakawa | G02F 1/133707 349/123 |

FOREIGN PATENT DOCUMENTS

TW 200708814 3/2007

\* cited by examiner

*Primary Examiner* — Ryan Crockett
(74) *Attorney, Agent, or Firm* — WPAT, PC; Justin King

(57) ABSTRACT

A pixel structure includes a patterned insulating layer and a patterned electrode layer. The patterned insulating layer includes a first area and a second area, and the patterned electrode layer includes a third layer and a fourth layer. The first area has a plurality of bar-shaped structures, the third area is a block electrode, and the fourth area is composed of a plurality of first bar-shaped electrodes. The third area is disposed opposite to the first area such that the third area is protruded according to the bar-shaped structures thereby forming a plurality of second bar-shaped electrodes. The fourth area is disposed opposite to the second area such that the first bar-shaped electrodes are formed on the second area.

20 Claims, 10 Drawing Sheets

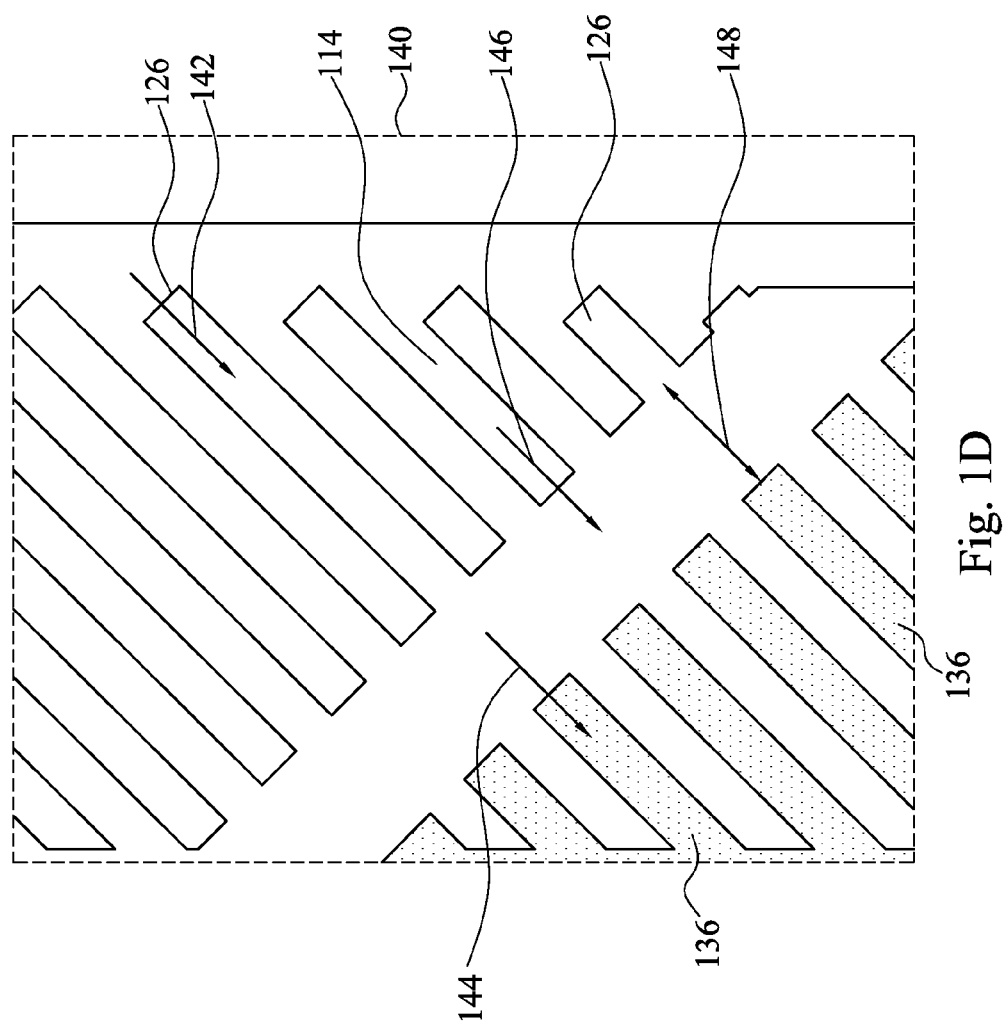

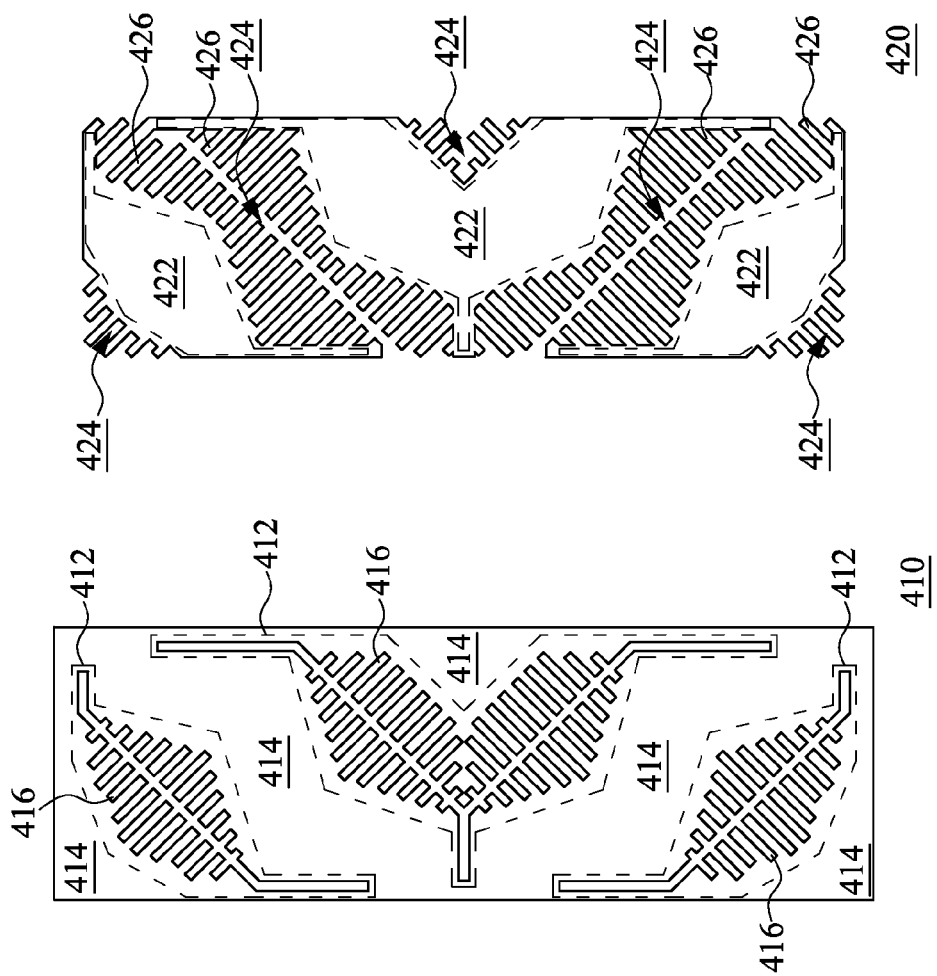

PIXEL STRUCTURE

RELATED APPLICATIONS

This application claims priority to Taiwan Application Serial Number 102129682, filed Aug. 19, 2013, which is herein incorporated by reference.

BACKGROUND

1. Field of Invention

The present invention relates to a structure for controlling light. More particularly, the present invention relates to a pixel structure.

2. Description of Related Art

Liquid crystal displays (LCDs) are widely used as display devices because of their ability to display high-quality images while using a relatively low amount of power. In the liquid crystal display, the liquid crystal molecules have specific orientations based on the long, bar-shaped and flat molecular structure thereof, and the orientation of the liquid crystal molecules is important in determining the light transmittance of the liquid crystal cells in the liquid crystal panel.

The orientation of liquid crystal molecules is determined by the electrode layer of the pixel structure. The different types of arrangements for the conventional electrode layer include Multi-Domain Vertical Alignment (MVA) obtained by rubbing or the introduction of protrusions, Patterned Vertical Alignment (PVA), Polymer-Stabilized Alignment (PSVA) and vertical insulating pattern with full indium-tin-oxide (ITO). The electrodes of the PVA and PSVA technologies mainly have the ITO electrode formed on a flat insulating layer, whereas the electrode of the vertical insulating pattern with full ITO uses a patterned vertical insulating layer combined with an overlaying block conductive layer to form the final patterned electrode. That is, the vertical insulating pattern with full ITO uses an insulating layer with surface relief together with an overlaying electrode layer having the substantially same thickness to obtain the final patterned electrode structure; however, when using the conventional electrode arrangement based on the vertical insulating pattern with full ITO design, several drawbacks such as unstable orientation, dark-state light leakage and slow liquid crystal response time may occur.

In view of the foregoing, there exist problems and disadvantages in the existing technology that await further improvement. However, those of ordinary skill in the art have been unable to find solutions to such problems and disadvantages.

SUMMARY

The following presents a simplified summary of the disclosure in order to provide a basic understanding to the reader. This summary is not an extensive overview of the disclosure and it does not identify key/critical elements of the present invention or delineate the scope of the present invention.

One aspect of the present disclosure is directed to a pixel structure which comprises a patterned insulating layer and a patterned electrode layer. The patterned insulating layer comprises a first area and a second area, whereas the patterned electrode layer comprises a third area and a fourth area. The first area has a plurality of bar-shaped structures thereon, the third area is a block electrode, and the fourth area is composed of a plurality of first bar-shaped electrodes. The third area is disposed opposite to the first area such that the third area is protruded according to the bar-shaped structures, thereby forming a plurality of second bar-shaped electrodes, whereas the fourth area is disposed opposite to the second area such that the first bar-shaped electrodes are formed on the second area.

In view of the foregoing, according to the technical content of the present invention, embodiments of the present invention provide a pixel structure to address the drawbacks associated with the conventional arrangement of the electrode layer, in which said drawbacks include unstable orientation, dark-state light leakage and slow liquid crystal response time.

These and other features, aspects, and advantages of the present invention, as well as the technical means and embodiments employed by the present invention, will become better understood with reference to the following description in connection with the accompanying drawings and appended claims.

BRIEF DESCRIPTION OF THE DRAWINGS

The invention can be more fully understood by reading the following detailed description of the embodiments, with reference made to the accompanying drawings as follows:

FIG. 1D is a schematic diagram illustrating a portion of FIG. 1C of the present invention in an enlarged state;

FIG. 4A is a schematic diagram illustrating the patterned insulating layer of a pixel structure according to embodiments of the present invention;

FIG. 4B is a schematic diagram illustrating the patterned electrode layer of a pixel structure according to embodiments of the present invention;

Figure 1C:
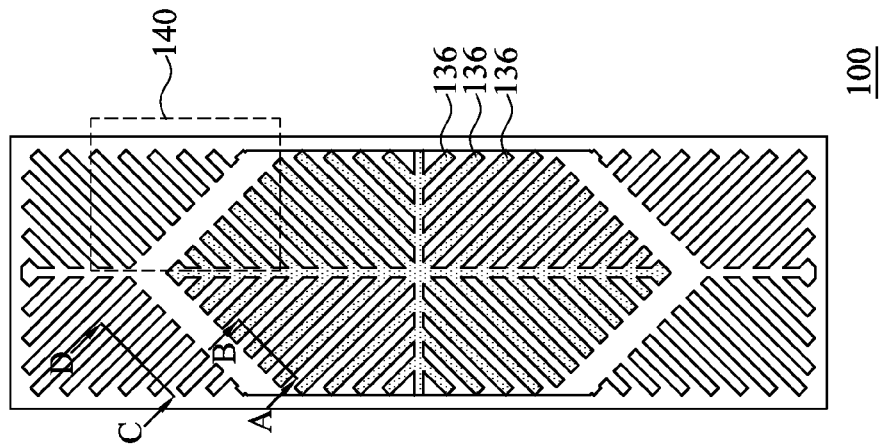
FIG. 1C is a schematic diagram illustrating a pixel structure according to embodiments of the present invention.

In accordance with common practice, the various described features/elements are not drawn to scale but instead are drawn to best illustrate specific features/elements relevant to the present invention. Also, wherever possible, the same or similar reference numerals are used in the drawings and the description to refer to the same or like parts.

DETAILED DESCRIPTION

The detailed description provided below in connection with the appended drawings is intended as a description of the present examples and is not intended to represent the only forms in which the present example may be constructed or utilized. The description sets forth the functions of the examples and the sequence of steps for constructing and operating the examples. However, the same or equivalent functions and sequences may be accomplished by different examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular.

Figure 1B:
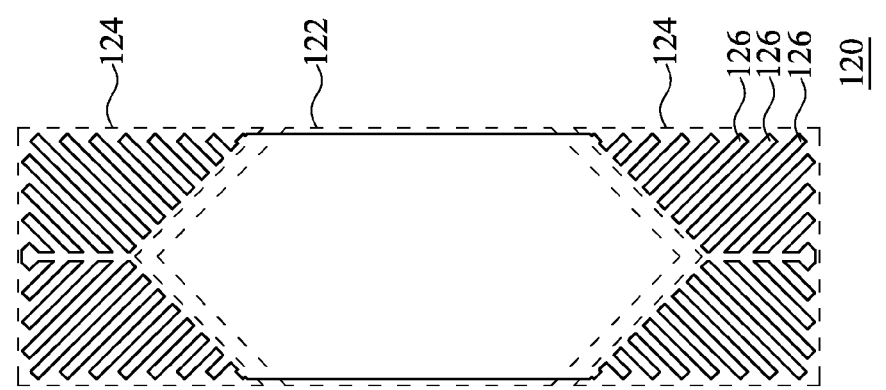
FIG. 1B is a schematic diagram illustrating a patterned electrode layer of a pixel structure according to embodiments of the present invention.
Figure 1A:
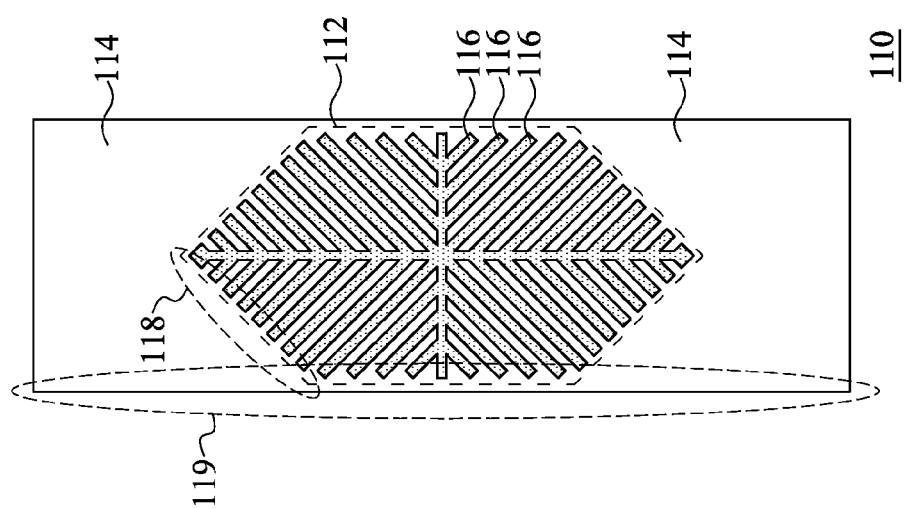
FIG. 1A is a schematic diagram illustrating a patterned insulating layer of a pixel structure according to embodiments of the present invention.

Referring to FIG. 1A, FIG. 1B and FIG. 1C, which schematically illustrate a patterned insulating layer 110, a patterned electrode layer 120 and a combined structure of said two structural layers, respectively.

As illustrated in 1A, the patterned insulating layer 110 comprises a first area 112 and a second area 114. There are a plurality of bar-shaped structures 116 on the first area 112. The bar-shaped structures 116 are disposed together to form a cross-shaped main structure at the center of the first area 112. The remaining bar-shaped structures 116 extend outwardly and radially from the cross-shaped main structure, and the range of the extension is such that these bar-shaped structures do not extend past the first area 112 of the patterned insulating layer 110. The second area 114 of the patterned insulating layer 110 can be a flat area. In one embodiment, the height of the second area 114 is lower than the height of the bar-shaped structures 116.

However, it is to be noted that the present disclosure is not limited to the configuration disclosed in FIG. 1A, which is only used to illustratively describe one embodiment of the present disclosure, and persons having ordinary skill in the art may selectively arrange the shape, extension orientation and connection relationship of the bar-shaped structures 116 depending on actual requirements.

Next, referring to FIG. 1B, the patterned electrode layer 120 comprises a third area 122 and a fourth area 124. The third area 122 of the patterned electrode layer 120 can be a block electrode, while the fourth area 124 of the patterned electrode layer 120 can be composed of a plurality of first bar-shaped electrodes 126. The first bar-shaped electrodes 126 connect to the block electrode of the third area 122, and extend outwardly and radially from the block electrode. In one embodiment, the thicknesses of the third area 122 and fourth area 124 of the patterned electrode layer 120 may be the same. Alternatively, the thickness of the third area 122 may be greater or smaller than that of the fourth area 124.

However, it is to be noted that the present disclosure is not limited to the configuration illustrated in FIG. 1B, which is only used to illustratively describe one embodiment of the present disclosure, and persons having ordinary skill in the art may selectively arrange the shape and structure of the third area 122, and may arrange the shape, extension orientation and connection relationship of the first bar-shaped electrodes 126 of the fourth area 124 depending on actual requirements.

Reference is now made to FIG. 1C which illustrates a pixel structure 100 that is composed of the patterned insulating layer 110 and the patterned electrode layer 120. With respect to structure, the third area 122 of the patterned electrode layer 120 is disposed opposite to the first area 112 of the patterned insulating layer 110, such that the third area 122 is protruded in a manner corresponding to the bar-shaped structures 116, thereby forming a plurality of second bar-shaped electrodes 136. Moreover, the fourth area 124 of the patterned electrode layer 120 is disposed opposite to the second area 114 of the patterned insulating layer 110, such that the first bar-shaped electrodes 126 are formed on the second area 114.

Specifically, the electrode structure composed of the first area 112 of the patterned insulating layer 110 and the third area 122 of the patterned electrode layer 120 corresponds to the vertical insulating pattern with full ITO technology, and the electrode structure composed of the second area 114 of the patterned insulating layer 110 and the fourth area 124 of the patterned electrode layer 120 is the same as the patterned conductive layer electrode structure of the conventional polymer-stabilized vertical alignment (PSVA) technology. In another embodiment, the electrode structure composed of the second area 114 of the patterned insulating layer 110 and the fourth area 124 of the patterned electrode layer 120 is the same as the patterned conductive layer electrode structure of the conventional polymer-stabilized alignment (PSA).

Since the vertical insulating pattern with full ITO technology and the patterned conductive layer electrode technology both have their own advantages and disadvantages, embodiments of the present invention, by adjusting the ratio between the vertical insulating pattern with full ITO technology and the patterned conductive layer electrode technology in the pixel structure 100, maintain the advantages of the vertical insulating pattern with full ITO technology and the patterned conductive layer electrode technology, and address the disadvantages of the vertical insulating pattern with full ITO technology and the patterned conductive layer electrode technology. Experimental data related to the pixel structure 100 according to embodiments of the present invention, the vertical insulating pattern with full ITO technology and the patterned conductive layer electrode technology are summarized below.

TABLE 1

Comparison among the present invention, the vertical insulating pattern with full ITO technology, and the patterned conductive layer electrode technology.

| Item | Patterned conductive layer electrode | Vertical insulating pattern with full ITO PV = 0.5 μm | The present invention PV = 0.2 μm |
|---|---|---|---|
| $L_0$ (black) | 0.023 nits | 0.154 nits | 0.037 nits |
| Contrast ratio (CR) | 3630 | 625 | 2261 |
| Transmittance (Tr.) | 100% | 119.7% | 103.9% |

The data indicated in Table 1 were obtained by comparing the electrode structures according to the conventional patterned conductive layer electrode technology, the conventional vertical insulating pattern with full ITO technology, and embodiments of the present invention, in which the total of the line and space of each electrode structure was 8 μm. Specifically, each of the line and space of the electrode structure according to the patterned conductive layer electrode technology was 4 μm, and each of the line and space of the insulating layer structure according to the vertical insulating pattern with full ITO technology was 4 μm. The thickness of the insulating layer (PV) was about 0.5 μm. In the present invention, the structure corresponding to the patterned conductive layer electrode technology had a line and space each of 4 μm, and the structure corresponding to the vertical insulating pattern with full ITO technology had a line and space each of 4 μm. Moreover, the thickness of the patterned insulating layer 110 (PV) was 0.2 μm.

Referring to Table 1, the contrast ratios (CR) of the electrode structures of the patterned conductive layer electrode technology, the vertical insulating pattern with full ITO technology and the pixel structure 100 according to embodiments of the present invention are, respectively, 3630, 625 and 2261. Hence, it is evident that the pixel structure 100 of the present disclosure maintains the high contrast ratio associated with the patterned conductive layer electrode technology, and improves the low contrast ratio associated with the structure of the vertical insulating pattern with full ITO technology. Additionally, the transmittances (Tr.) of the structures of the patterned conductive layer electrode technology, the vertical insulating pattern with full ITO technology, and pixel structure 100 according to embodiments of the present invention are, respectively, 100%, 119.7% and 103.9%. Hence, it is evident that the pixel structure 100 of the present disclosure maintains the high transmittance possessed by the vertical insulating pattern with full ITO technology, while improving the low transmittance of the structure of the patterned conductive layer electrode technology. Moreover, when the grayscale of the liquid crystals is $L_0$ (black), the brightnesses (i.e., the dark-state light leakage) of the structures of the patterned conductive layer electrode technology, the vertical insulating pattern with full ITO technology, and the pixel structure 100 according to embodiments of the present invention are 0.023, 0.154 and 0.037 nits, respectively. Hence, the pixel structure 100 of the present disclosure improves the problem of dark-state light leakage experienced by the vertical insulating pattern with full ITO technology.

In one embodiment, referring back to FIG. 1A, the first area 112 is located at the center of the patterned insulating layer 110, while the second area 114 is located at the periphery of the patterned insulating layer 110. Moreover, referring to FIG. 1B, the third area 122 is located at the center of the patterned electrode layer 120, while the fourth area 124 is located at the periphery of the patterned electrode layer 120. Said arrangement allows the second bar-shaped electrodes 136 to be located at the center of the pixel structure 100, and allows the first bar-shaped electrodes 126 to be located at the periphery of the pixel structure 100. As a result, the orientation of liquid crystals is altered at the border between the electrodes 126 and 136, as well as at the border between the first bar-shaped electrodes 126 and the second area 114. Such alteration is discussed in detailed hereinbelow.

Reference is made to FIG. 1D which is a schematic diagram illustrating the area 140 of FIG. 1C of the present invention in an enlarged state. As illustrated in the drawing, the structure of the pixel structure 100 comprises three alterations of iso-surfaces resultant from the electrode borders, and said alterations of the iso-surfaces may determine the orientation of the liquid crystals. The first alteration of the iso-surface occurs at the electrode edges of the first bar-shaped electrodes 126, the second alteration of the iso-surface occurs between the first bar-shaped electrodes 126 and the second bar-shaped electrodes 136, and the third alteration of the iso-surface occurs between the second area 114 and the third area 122 among the first bar-shaped electrodes 126.

The first to third alterations of the iso-surface will cause the liquid crystals to bias toward the first direction 142, the second direction 144 and the third direction 146. As is evident in the drawing, the orientations of the three liquid crystals are the same, that is, they all tilt inwardly. Such an arrangement may result in a stable orientation of the liquid crystals of the pixel structure 100 according to embodiments of the present invention.

As shown in FIG. 1D, each of the second bar-shaped electrodes 136 will align with one of the first bar-shaped electrodes 126, thereby forming a distance 148 at the border of the two. As a result, the problem of misalignment may be prevented. The distance is about 1 μm to 10 μm, preferably, about 1 μm to 3 μm (e.g., 2 μm). In other words, the distance between the first area 112 at which the second bar-shaped electrodes 136 reside and the fourth area 124 at which the first bar-shaped electrodes 126 reside is about 1 μm to 10 μm, preferably, about 1 μm to 3 μm (e.g., 2 μm). Stated differently, the length of the third area 122 (block electrode) is greater than the length of the first area 112 by about 1 μm to 10 μm, preferably, about 1 μm to 3 μm (e.g., 2 μm).

In one embodiment, referring to FIG. 1A, the first area 112 of the patterned insulating layer 110 can quadrilateral, pentagonal, hexagonal (shield-shaped), heptagonal or octagonal in shape; however, the present disclosure is not limited to thereto, and persons having ordinary skill in the art may flexibly choose the shape of the first area 112 of the patterned insulating layer 110 depending on actual requirements. When the shape of the first area 112 of the patterned insulating layer 110 is hexagonal (shield-shaped), the included angle of one side of the hexagon (e.g., the side 118) and one side of the patterned insulating layer 110 (e.g., the side 119) is about 35 to 55 degrees. In some embodiments, the included angle can be about 40 to 50 degrees. For example, the included angle can be about 45 degrees.

Referring again to FIG. 1A, the area of the first area 112 accounts for about 40% to 60% of the total area of the patterned insulating layer 110. Alternatively, the area of the first area 112 accounts for about 45% to 55% of the total area of the patterned insulating layer 110. For example, the area of the first area 112 may account for about 50% of the total area of the patterned insulating layer 110. In one embodiment, referring to FIG. 1B, the area of the third area 122 accounts for about 40% to 60% of the total area of the patterned electrode layer 120, preferably, about 45% to 55% (e.g., 50%).

Figure 1E:
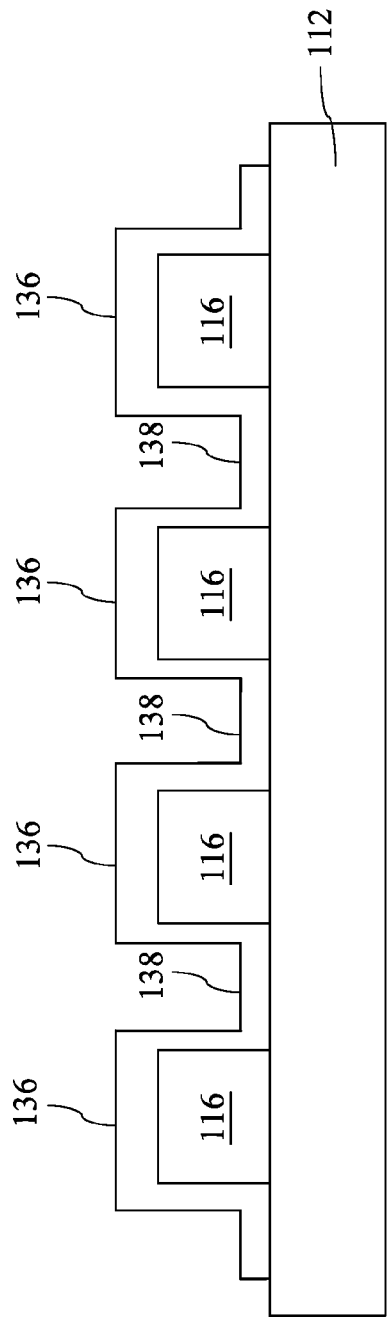
FIG. 1E is a schematic sectional diagram illustrating the pixel structure taken along line A-B in FIG. 1C of the present invention.

In another embodiment, referring to FIG. 1E, which is a schematic sectional diagram illustrating the pixel structure 100 taken along line A-B in FIG. 1C of the present invention, in the third area 122, a plurality of third bar-shaped electrodes 138 are formed between the bar-shaped structures 116, and the third bar-shaped electrodes 138 are connected to the second bar-shaped electrodes 136. Further, the height of the bar-shaped structures 116 of the first area 112 is about 0.1 μm to 1 μm. In some embodiments, the height can be about 0.2 μm to 0.8 μm, and in some other embodiments, the height can be about 0.4 μm to 0.6 μm.

Figure 1F:
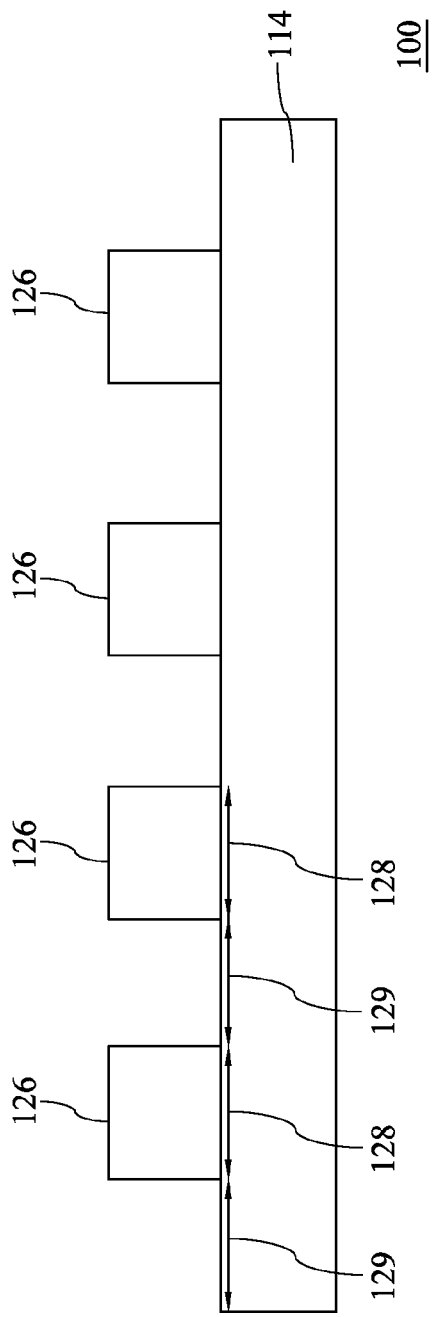
FIG. 1F is a schematic sectional diagram illustrating the pixel structure taken along line C-D in FIG. 1C of the present invention.

In yet another embodiment, referring to FIG. 1F, which is a schematic sectional diagram illustrating the pixel structure 100 taken along the line C-D in FIG. 1C of the present invention, the first bar-shaped electrodes 126 contacts a first portion 128 of the second area 114, while the second portion 129 of the second area 114 is not contacted with the first bar-shaped electrodes 126, and the height of the first portion 128 is the same as that of the second portion 129. Further, the thickness of the second area 114 is about 0.1 μm to 1 μm. In some embodiments, the thickness can be about 0.2 μm to 0.8 μm, and in some other embodiments, the thickness can be about 0.4 μm to 0.6 μm.

Figure 1G:
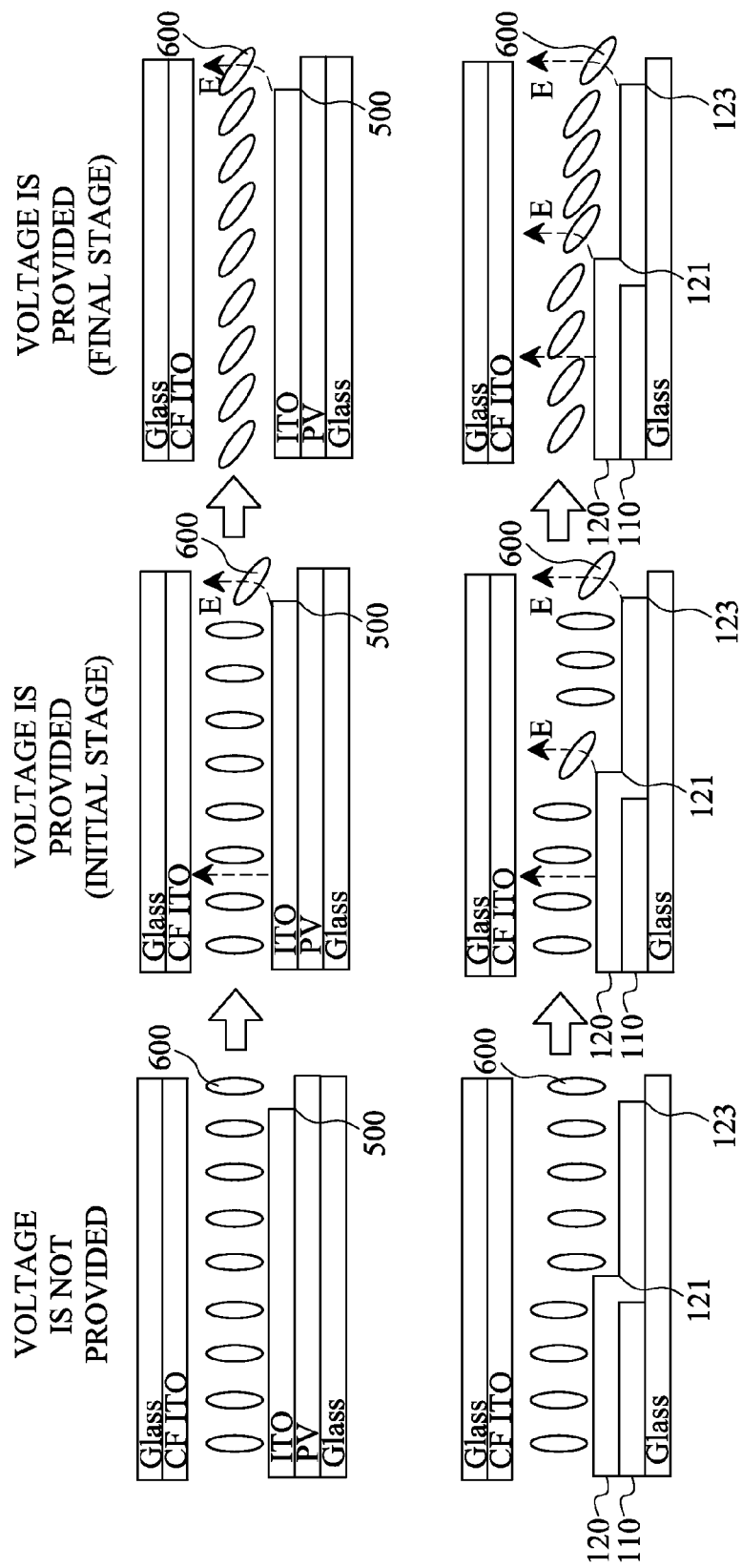
FIG. 1G is a schematic sectional diagram of a structure of a patterned conductive layer electrode or a vertical insulating pattern with full ITO, and a schematic sectional diagram of the pixel structure of FIG. 1C of the present invention.

Referring to FIG. 1G, the upper portion thereof is a schematic sectional diagram of the structure of a patterned conductive layer electrode or a vertical insulating pattern with full ITO technology, while the lower portion thereof is a schematic sectional diagram of the pixel structure 100 of FIG. 1C of the present invention. As illustrated in the drawing, the difference between the pixel structure 100 of the present disclosure and the structure of the patterned conductive layer electrode or vertical insulating pattern with full ITO technology is discussed in three stages. First, when a voltage is not provided, the liquid crystals 600 are not affected by the pixel electrode. Subsequently, in an initial stage where a voltage is provided, since the arrangement of the structure of the patterned conductive layer electrode or vertical insulating pattern with full ITO technology has only one electrode edge 500, the distortion of iso-surface is mainly generated from the only one electric fringe field E. Accordingly, the structure of the patterned conductive layer electrode or vertical insulating pattern with full ITO technology only activates a very small portion of the liquid crystals 600; however, using the arrangement according to the pixel structure 100 of the present disclosure, two electrode edges 121 and 123 are generated, and these electrode edges 121 and 123 result in the distortion of iso-surface thereby generated by two electric fringe fields E. Compared with the structure of the patterned conductive layer electrode or vertical insulating pattern with full ITO technology which has only a single electrode edge 500, when a voltage is provided, the pixel structure 100 of the present disclosure can activate more liquid crystals. Lastly, in the final stage where the voltage is provided, most of the liquid crystals are activated under the action of the pixel electrode. The experimental data of the structures are summarized in the table below.

TABLE 2

Response time

| Response time | | Patterned conductive layer electrode | Vertical insulating pattern with full ITO PV = 0.5 μm | The present invention PV = 0.2 μm |
|---|---|---|---|---|
| Cell gap = 3.0 μm | $T_{on}$ | 14.1 ms | 37.4 ms | 18.2 ms |
| | $T_{off}$ | 4.0 ms | 3.8 ms | 3.7 ms |
| | $T_{on} + T_{off}$ | 18.0 ms | 41.1 ms | 21.9 ms |

The data indicated in Table 2 were obtained by comparing the electrode structures according to the conventional patterned conductive layer electrode technology, the conventional vertical insulating pattern with full ITO technology, and embodiments of the present invention, in which the total of the line and space of each electrode structure was 8 μm. Specifically, each of the line and space of the electrode structure according to the patterned conductive layer electrode technology was 4 μm, and each of the line and space of the insulating layer structure according to the vertical insulating pattern with full ITO technology was 4 μm. The thickness of the insulating layer (PV) was about 0.5 μm. In the present invention, the structure corresponding to the patterned conductive layer electrode technology had a line and space each of 4 μm, and the structure corresponding to the vertical insulating pattern with full ITO technology had a line and space each of 4 μm. Moreover, the thickness of the patterned insulating layer 110 (PV) was 0.2 μm.

As shown in Table 2, as compared with the structure simply using the patterned conductive layer electrode technology, there is no significant difference regarding the overall response time ($T_{on}+T_{off}$) of the pixel structure 100 of the present disclosure. Further, in the structure simply using the vertical insulating pattern with full ITO technology, the overall response time ($T_{on}+T_{off}$) thereof is 41.1 ms, while the overall response time ($T_{on}+T_{off}$) of the pixel structure 100 according to embodiments of the present invention is 21.9 ms. In view of the foregoing, using the arrangement of the pixel structure 100 of the present disclosure may improve the response time of the liquid crystals.

Figure 2C:
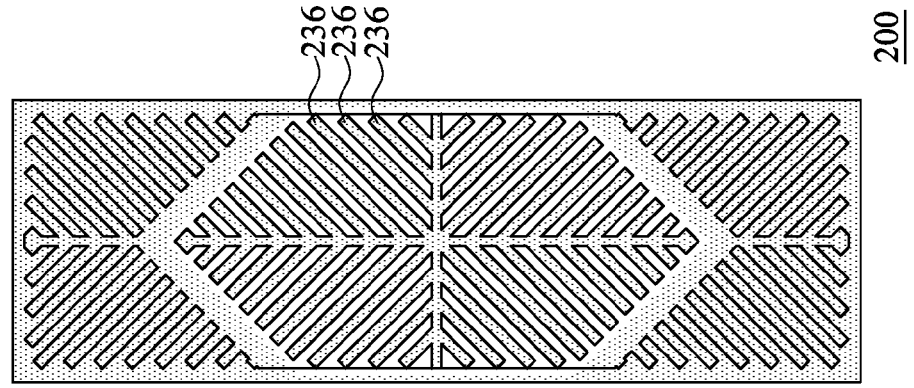
FIG. 2C is a schematic diagram illustrating a pixel structure according to embodiments of the present invention.
Figure 2B:
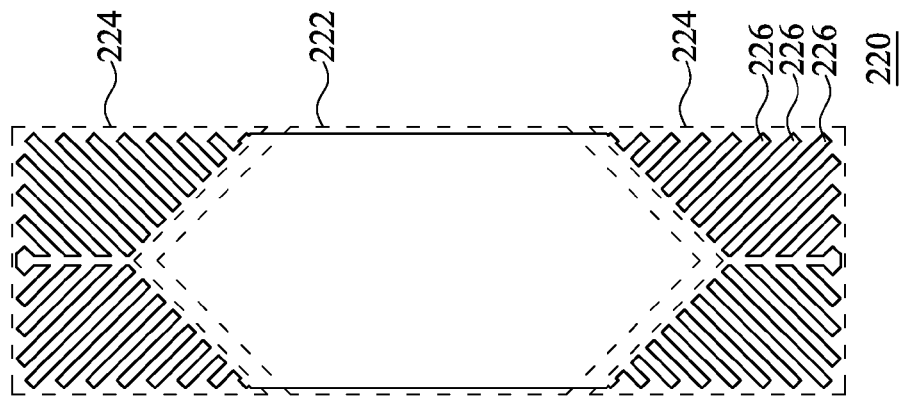
FIG. 2B is a schematic diagram illustrating the patterned electrode layer of a pixel structure according to embodiments of the present invention.
Figure 2A:
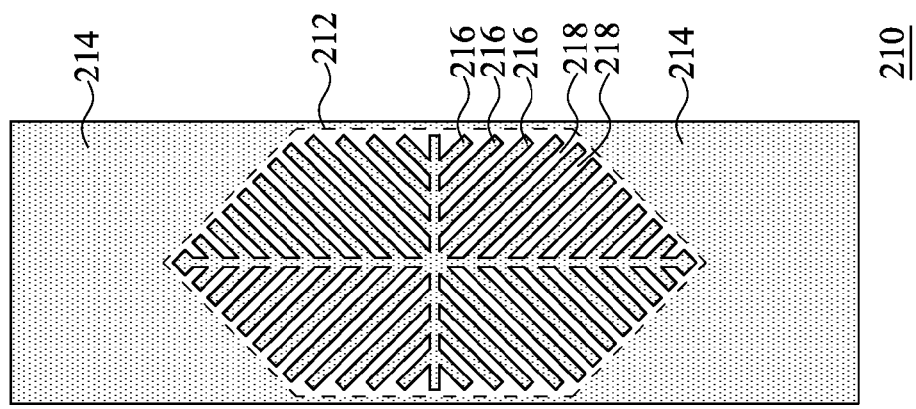
FIG. 2A is a schematic diagram illustrating the patterned insulating layer of a pixel structure according to embodiments of the present invention.

Reference is made to FIG. 2A, FIG. 2B and FIG. 2C which schematically illustrate the patterned insulating layer 210, the patterned electrode layer 220 and the combined structure of the two structural layers, respectively. As illustrated in FIG. 2A, the difference between the patterned insulating layer 210 and the patterned insulating layer 110 of FIG. 1A is that the height of the second area 214 is the same as the height of the bar-shaped structure 216. Put in a simpler way, in the patterned insulating layer 210, the portion 218 is sunken downwardly.

Moreover, the patterned electrode layer 220 of FIG. 2B is similar to the patterned electrode layer 120 of FIG. 1B. Further, the patterned insulating layer 210 and the patterned electrode layer 220 are combined to form the pixel structure 230 of FIG. 2C. Additionally, the third area (block electrode) 222 of the patterned electrode layer 220 is shrunk inwardly, as compared with the first area 212 of the patterned insulating layer 210, by about 1 μm to 10 μm, preferably, about 1 μm to 3 μm (e.g., 2 μm), so as to ensure that the alteration of iso-surface, once a voltage is supplied, can cause all the liquid crystals to tilt inwardly.

Figure 3C:
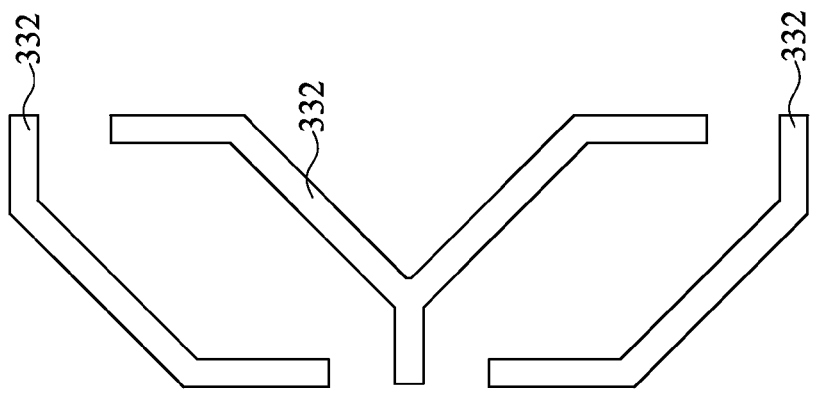
FIG. 3C is a schematic diagram illustrating a plurality of bar-shaped protrusions of a pixel structure according to embodiments of the present invention.
Figure 3B:
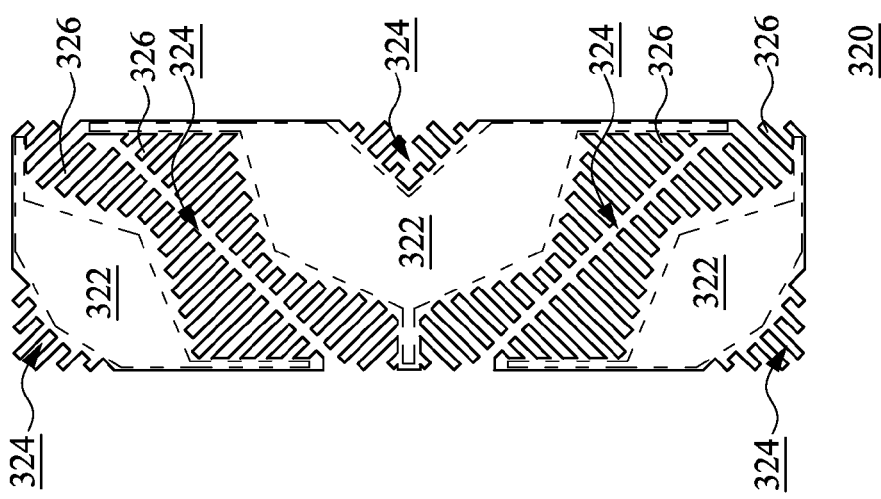
FIG. 3B is a schematic diagram illustrating the patterned electrode layer of a pixel structure according to embodiments of the present invention.
Figure 3A:
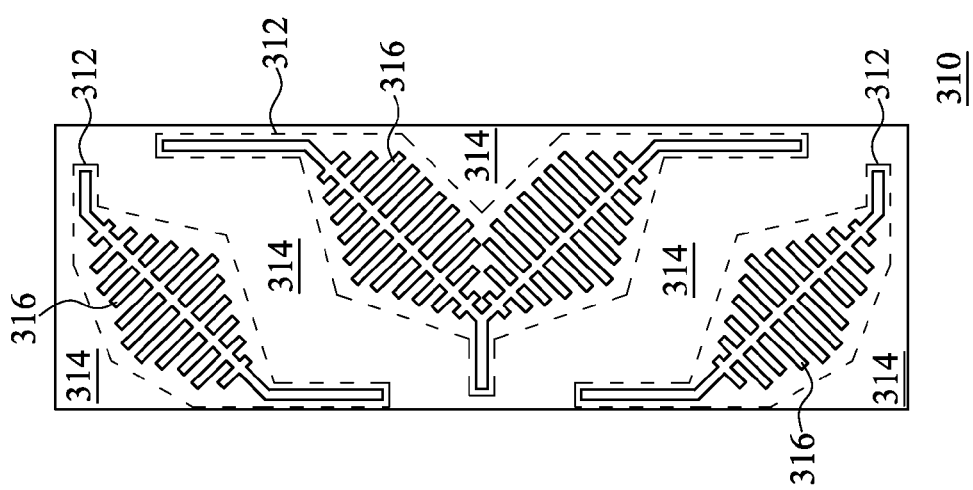
FIG. 3A is a schematic diagram illustrating the patterned insulating layer of a pixel structure according to embodiments of the present invention.

Reference is made to FIG. 3A, FIG. 3B, FIG. 3C, FIG. 3D and FIG. 3E which schematically illustrate the patterned insulating layer 310, the patterned electrode layer 320, the bar-shaped protrusions 332, the common electrode layer 340 and the combined structure of the four above-mentioned structural layers, respectively. As illustrated in FIG. 3A, the patterned insulating layer 310 on a lateral substrate is substantially the same to the patterned insulating layer 110 of FIG. 1A, with the exception that the first area of the patterned insulating layer 310 comprises a plurality of first sub-areas 312, the second area of the patterned insulating layer 310 comprises a plurality of second sub-areas 314, the first sub-areas 312 and the second sub-areas 314 are distributed across the patterned insulating layer 310, and the first sub-areas 312 and the second sub-areas 314 are arranged alternatingly. Similar to FIG. 1A, each of the first sub-areas 312 has a plurality of bar-shaped structures 316 thereon.

Additionally, referring to FIG. 3B, the patterned electrode layer 320 is similar to the patterned electrode layer 120 of the FIG. 1B, with the exception that the third area of the patterned electrode layer 320 comprises a plurality of third sub-areas 322, the fourth area of the patterned electrode layer 320 comprises a plurality of fourth sub-areas 324, and the third sub-areas 322 and the fourth sub-areas 324 are arranged alternatingly. Similar to FIG. 1B, the fourth sub-areas 324 can be composed of a plurality of first bar-shaped electrodes 326. In arrangement, each of the third sub-areas 322 is disposed opposite to one of the first sub-areas 312; additionally, each of the fourth sub-areas 324 is disposed opposite to one of the second sub-areas 314.

Figure 3E:
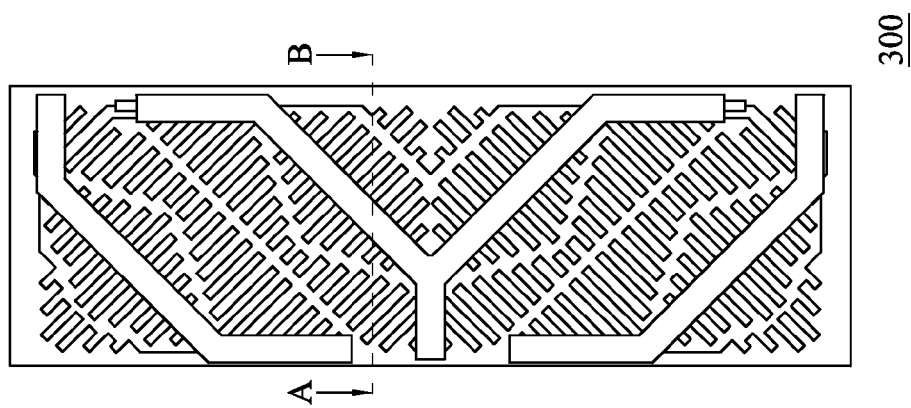
FIG. 3E is a schematic diagram illustrating a pixel structure according to embodiments of the present invention.
Figure 3D:
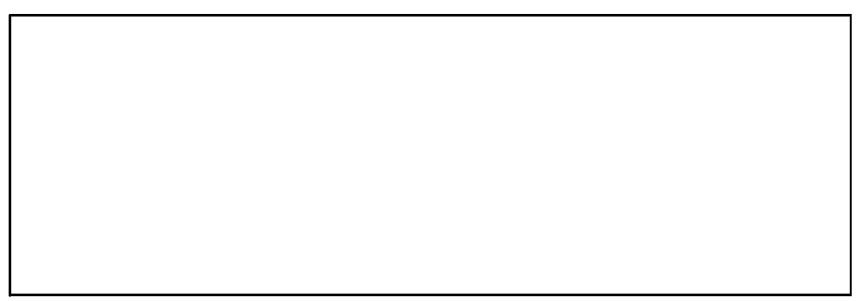
FIG. 3D is a schematic diagram illustrating the common electrode layer of a pixel structure according to embodiments of the present invention.

Referring to FIG. 3C, each of the bar-shaped protrusions 332 disposed on an opposite lateral substrate is disposed opposite to one of the first sub-areas 312. Moreover, the common electrode layer 340 of FIG. 3D is disposed on the bar-shaped protrusions 332. In FIG. 3E, the patterned insulating layer 310, the patterned electrode layer 320, the bar-shaped protrusions 332, and the common electrode layer 340 are combined correspondingly, thereby forming the pixel structure 300. The bar-shaped protrusions 332 may be formed of an insulating layer. Since the bar-shaped protrusions 332 are arranged under the common electrode layer 340, they can cause the initial pretilt angle of the liquid crystals to be altered because of the surface relief caused by the bar-shaped protrusions 332. As a result, the intensity of the electric field generated by the common electrode layer 340 is altered once the voltage is provided, so as to control the orientation of the liquid crystals. However, the present invention is not limited to the structures illustrated in FIG. 3A to FIG. 3E, and persons having ordinary skill in the art may selectively arrange the shape, position and connection relationship of the structure depending on actual requirements.

Figure 3F:
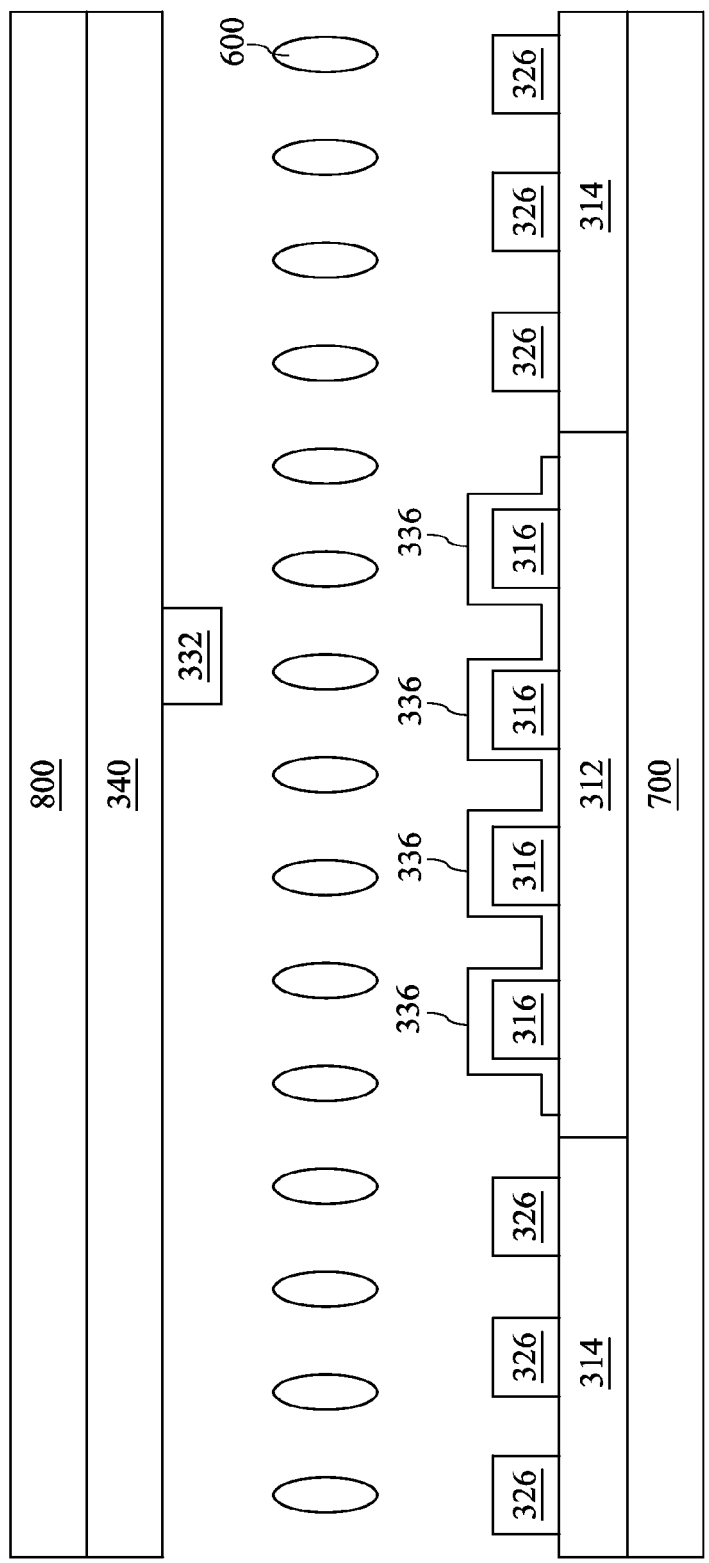
FIG. 3F is a schematic sectional diagram illustrating the pixel structure taken along the line A-B in FIG. 3E of the present invention.

Referring to FIG. 3F, which is a schematic sectional diagram illustrating the pixel structure 300 taken along the line A-B in FIG. 3E of the present invention, on a lateral substrate 700, there are the first sub-areas 312 and second sub-areas 314 of the patterned insulating layer 310. On the first sub-areas 312, there are a plurality of bar-shaped structures 316. When the patterned electrode layer 320 is disposed opposite to the patterned insulating layer 310, the first bar-shaped electrodes 326 of the patterned electrode layer 320 are formed on the second sub-areas 314, whereas the third sub-areas 322 of the patterned electrode layer 320 are protruded according to the bar-shaped structures 316, thereby forming a plurality of second bar-shaped electrodes 336. Further, on another lateral substrate 800, there is a common electrode layer 340, wherein the bar-shaped protrusions 332 are disposed on the common electrode layer 340. A liquid crystal layer 600 is disposed between the overall structure of the lateral substrate 700 and the overall structure of another lateral substrate 800.

Figure 4D:
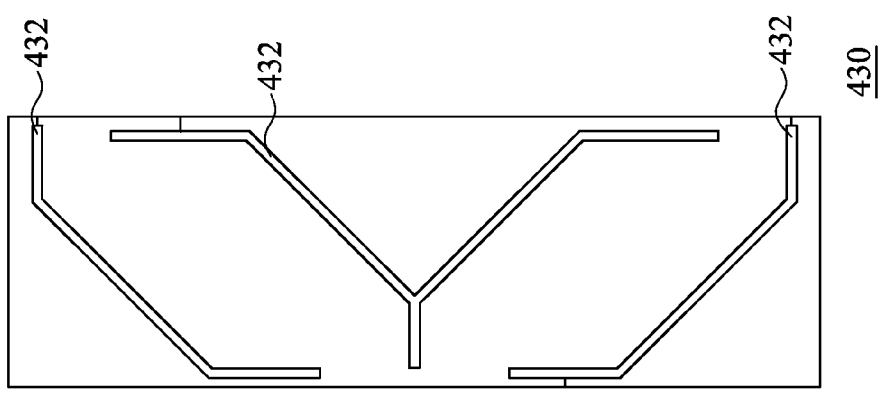
FIG. 4D is a schematic diagram illustrating a pixel structure according to embodiments of the present invention.
Figure 4C:
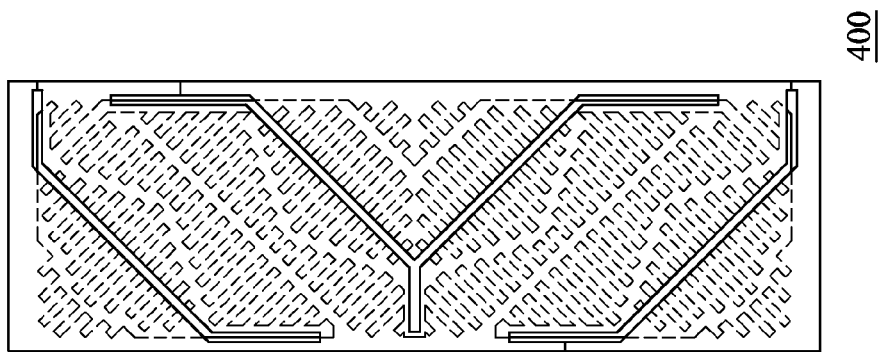
FIG. 4C is a schematic diagram illustrating a common electrode layer of a pixel structure according to embodiments of the present invention.

Reference is now made to FIG. 4A, FIG. 4B, FIG. 4C and FIG. 4D which schematically illustrate the patterned insulating layer 410, the patterned electrode layer 420, the common electrode layer 430 and the combined structure of the three above-mentioned structural layers, respectively. As illustrated in FIG. 4A, the patterned insulating layer 410 on a lateral substrate is similar to the patterned insulating layer 310 of FIG. 3A, and the first sub-areas 412 thereof have a plurality of bar-shaped structures 416 thereon. The patterned electrode layer 420 of FIG. 4B is similar to the patterned electrode layer 320 of FIG. 3B, and the fourth sub-areas 424 is composed of a plurality of first bar-shaped electrodes 426. Referring to FIG. 4C, the common electrode layer 430 is designed to be located on another lateral substrate and is disposed above the patterned electrode layer 420. The common electrode layer 430 comprises a plurality of bar-shaped through holes 432, and each of the bar-shaped through holes 432 is disposed correspondingly to one of the first sub-areas 412. As shown in FIG. 4D, the patterned insulating layer 410, the patterned electrode layer 420, and the common electrode layer 430 are combined correspondingly, thereby forming the pixel structure 400. However, the present invention is not limited to the structures illustrated in FIG. 4A to FIG. 4D, and persons having ordinary skill in the art may selectively arrange the shape, position and connection relationship of the structure depending on actual requirements.

In view of the above embodiments of the present disclosure, it is apparent that the application of the present invention has a number of advantages. Embodiments of the present invention provide a pixel structure to address the drawbacks associated with conventional arrangement of electrode layer, such as unstable orientation, dark-state light leakage and slow liquid crystal response time.

Specifically, embodiments of the present invention, by adjusting the ratio between the vertical insulating pattern with full ITO technology and the patterned conductive layer electrode technology in the pixel structure, maintain the advantages of the vertical insulating pattern with full ITO technology and the patterned conductive layer electrode technology, and address the disadvantages of the vertical insulating pattern with full ITO technology and the patterned conductive layer electrode technology, so that the pixel structure of the present invention may maintain the high contrast ratio possessed by the patterned conductive layer electrode technology and the high transmittance associated with the vertical insulating pattern with full ITO technology, and at the same time, address the problem of dark-state light leakage encountered by the vertical insulating pattern with full ITO technology. Moreover, embodiments of the present invention, by arranging the relative position of the vertical insulating pattern with full ITO technology and the patterned conductive layer electrode technology in the pixel structure, further achieve a more stable liquid crystal orientation of the pixel structure 100 according to embodiments of the present invention. Further, since the pixel structure according to embodiments of the present invention combines the vertical insulating pattern with full ITO technology and the patterned conductive layer electrode technology with an appropriate arrangement, the response speed of the liquid crystals in the pixel structure according to the present invention is enhanced.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A pixel structure, comprising:
 a patterned insulating layer, comprising a first area and a second area, wherein the first area has a plurality of bar-shaped structures; and
 a patterned electrode layer, comprising a third area and a fourth area, wherein the third area is a block electrode, and the fourth area is composed of a plurality of first bar-shaped electrodes, wherein the third area is disposed opposite to the first area such that the patterned electrode layer covers the patterned insulating layer in the first area and the bar-shaped structures elevate the patterned electrode layer, thereby forming a plurality of second bar-shaped electrodes; and the fourth area is disposed opposite to the second area such that the first bar-shaped electrodes are formed on the second area.

2. The pixel structure according to claim 1, wherein the height of a first portion of the second area that contacts the first bar-shaped electrodes is the same as the height of a second portion of the second area that does not contact the first bar-shaped electrodes.

3. The pixel structure according to claim 2, wherein
 the first area comprises a plurality of first sub-areas, and the second area comprises a plurality of second sub-areas, wherein the first sub-areas and the second sub-areas are distributed across the patterned insulating layer, and each of the first sub-areas and each of the second sub-areas are arranged alternately; and
 the third area comprises a plurality of third sub-areas, and the fourth area comprises a plurality of fourth sub-areas, wherein the third sub-areas and the fourth sub-areas are distributed across the patterned electrode layer, and each of the third sub-areas and each of the fourth sub-areas are arranged alternately, wherein each of the third sub-areas is disposed opposite to one of the first sub-areas, and each of the fourth sub-areas is disposed opposite to one of the second sub-areas.

4. The pixel structure according to claim 2, wherein the third area forms a plurality of third bar-shaped electrodes between the bar-shaped structures, wherein the third bar-shaped electrodes are interconnected with the second bar-shaped electrodes.

5. The pixel structure according to claim 4, wherein
 the first area comprises a plurality of first sub-areas, and the second area comprises a plurality of second sub-areas, wherein the first sub-areas and the second sub-areas are distributed across the patterned insulating layer, and each of the first sub-areas and each of the second sub-areas are arranged alternately; and
 the third area comprises a plurality of third sub-areas, and the fourth area comprises a plurality of fourth sub-areas, wherein the third sub-areas and the fourth sub-areas are distributed across the patterned electrode layer, and each of the third sub-areas and each of the fourth sub-areas are arranged alternately, wherein each of the third sub-areas is disposed opposite to one of the first sub-areas, and each of the fourth sub-areas is disposed opposite to one of the second sub-areas.

6. The pixel structure according to claim 1, wherein the patterned electrode layer covers the patterned insulating layer in the first area and the bar-shaped structures elevate the block electrode of the patterned electrode, such that the first bar-shaped electrodes of the patterned electrode extends outwardly from the block electrode which is elevated, and surfaces of the first bar-shaped electrodes and the second bar-shaped electrodes are respectively at two different horizontal levels.

7. The pixel structure according to claim 6, wherein the first area is disposed at the center of the patterned insulating layer, the second area is disposed at the periphery of the patterned insulating layer, the third area is disposed at the center of the patterned electrode layer, and the fourth area is disposed at the periphery of the patterned electrode layer.

8. The pixel structure according to claim 6, wherein the area of the first area accounts for about 40%-60% of the total area of the patterned insulating layer.

9. The pixel structure according to claim 6, wherein
 the first area comprises a plurality of first sub-areas, and the second area comprises a plurality of second sub-areas, wherein the first sub-areas and the second sub-areas are distributed across the patterned insulating layer, and each of the first sub-areas and each of the second sub-areas are arranged alternately; and
 the third area comprises a plurality of third sub-areas, and the fourth area comprises a plurality of fourth sub-areas, wherein the third sub-areas and the fourth sub-areas are distributed across the patterned electrode layer, and each of the third sub-areas and each of the fourth sub-areas are arranged alternately, wherein each of the third sub-areas is disposed opposite to one of the first sub-areas, and each of the fourth sub-areas is disposed opposite to one of the second sub-areas.

10. The pixel structure according to claim 1, wherein the area of the first area accounts for about 40%-60% of the total area of the patterned insulating layer.

11. The pixel structure according to claim 1, wherein the first area has a quadrilateral or hexagonal shape.

12. The pixel structure according to claim 11, wherein when the shape of the first area is hexagonal, the included angle between one side of the hexagonal and one side of the patterned insulating layer is about 35-55 degrees.

13. The pixel structure according to claim 1, wherein
 the first area comprises a plurality of first sub-areas, and the second area comprises a plurality of second sub-areas, wherein the first sub-areas and the second sub-areas are distributed across the patterned insulating layer, and each of the first sub-areas and each of the second sub-areas are arranged alternately; and
 the third area comprises a plurality of third sub-areas, and the fourth area comprises a plurality of fourth sub-areas, wherein the third sub-areas and the fourth sub-areas are distributed across the patterned electrode layer, and each of the third sub-areas and each of the fourth sub-areas are arranged alternately, wherein each of the third sub-areas is disposed opposite to one of the first sub-areas, and each of the fourth sub-areas is disposed opposite to one of the second sub-areas.

14. The pixel structure according to claim 13, further comprising:
 a plurality of bar-shaped protrusion, wherein each of the bar-shaped protrusions is disposed opposite to one of the first sub-areas; and
 a common electrode layer disposed on the bar-shaped protrusions.

15. The pixel structure according to claim 13, further comprising:
   a common electrode layer disposed on the patterned electrode layer, wherein the common electrode layer comprises a plurality of bar-shaped through holes, wherein each of the bar-shaped through holes is disposed opposite to one of the first sub-areas.

16. The pixel structure according to claim 1, wherein the patterned electrode layer comprises two falling edges respectively located at edges of the bar-shaped structures and ends of the first bar-shaped electrodes.

17. The pixel structure according to claim 1, wherein each of the plurality of first bar-shaped electrodes is in line with one of the plurality of second bar-shaped electrodes.

18. The pixel structure according to claim 1, wherein the plurality of bar-shaped structures of the patterned insulating layer define patterns of the plurality of second bar-shaped electrodes.

19. The pixel structure according to claim 1, further comprising:
   a common electrode layer disposed on the patterned electrode layer, wherein the common electrode layer comprises at least one bar-shaped through hole, wherein the at least one bar-shaped through hole is disposed opposite to the first area.

20. The pixel structure according to claim 1, wherein the first bar-shaped electrodes and the second bar-shaped electrodes belong to a same film layer.

\* \* \* \* \*